United States Patent
Briskin et al.

(10) Patent No.: US 6,731,448 B2
(45) Date of Patent: May 4, 2004

(54) ACCURATE RESISTANCE MEASUREMENT FOR MAGNETORESISTIVE HEAD

(75) Inventors: Boris Briskin, Vadnais Heights, MN (US); Jason A. Christianson, Apple Valley, MN (US); Ronen Malka, Eden Prairie, MN (US)

(73) Assignee: Agere Systems, Inc., Allentown, PA (US)

( * ) Notice: Subject to any disclaimer, the term of this patent is extended or adjusted under 35 U.S.C. 154(b) by 246 days.

(21) Appl. No.: 09/964,083

(22) Filed: Sep. 26, 2001

(65) Prior Publication Data

US 2003/0058566 A1 Mar. 27, 2003

(51) Int. Cl.$^7$ ................................................. G11B 5/03
(52) U.S. Cl. ............................. 360/66; 324/212; 360/67
(58) Field of Search ............................. 360/31, 63, 66, 360/67; 324/212, 691, 537, 601

(56) References Cited

U.S. PATENT DOCUMENTS 6,115,201 A * 9/2000 Enarson et al. ............... 360/66
6,320,713 B1 * 11/2001 Tretter et al. ................. 360/66

* cited by examiner

*Primary Examiner*—David Hudspeth
*Assistant Examiner*—Daniell L. Negron
(74) *Attorney, Agent, or Firm*—Kinney & Lange, P.A.

(57) ABSTRACT

A magnetic data storage and retrieval system includes a magnetoresistive head, a resistor, a preamplifier circuit, a voltage measurement circuit, and a resistance calculation circuit. The preamplifier circuit is operably coupled to the magnetoresistive head and the resistor, and applies a first current to the magnetoresistive head and a second current to the resistor. The voltage measurement circuit measures a first voltage across the magnetoresistive head and a second voltage across the resistor. The resistance calculation circuit calculates a resistance of the magnetoresistive head based upon the first and second voltages.

20 Claims, 1 Drawing Sheet

ACCURATE RESISTANCE MEASUREMENT FOR MAGNETORESISTIVE HEAD

BACKGROUND OF THE INVENTION

The present invention relates generally to the field of magnetic data storage and retrieval systems. In particular, the present invention relates to a magnetic data storage and retrieval system having improved magnetoresistive head resistance measurement accuracy.

In magnetic data storage and retrieval systems, a magnetoresistive (MR) head utilizes MR elements to sense the selective magnetization of tracks on a magnetic data storage medium. A typical MR element is formed from an alloy of materials so as to have an electrical resistance which varies in the presence of a magnetic field. By passing a bias current through the MR element, the selective magnetization of a corresponding track can be determined in relation to variations in voltage detected across the MR element.

The sensitivity of an MR head depends on many factors. One of the most significant factors is the bias current provided to the MR head. The ability to read a signal from a magnetic medium is, in part, a function of the amount of bias current supplied to the MR head. Signal sensitivity can be increased by increasing the amount of bias current supplied to the MR head. Therefore, increased bias current will generally produce an improved signal-to-noise ratio and will therefore result in lower error rates.

However, excessive bias current can significantly shorten the useful life span of the MR head. It is important to ensure that the maximum power dissipation capability of the MR head is not exceeded. Because the MR element operates as a highly sensitive resistance, the power dissipated by the MR element will be proportional to the resistance of the MR element multiplied by the square of the bias current. Accordingly, there is an upper limit on the magnitude of the bias current that can be applied to any given MR head, and the application of too large a bias current, even momentarily, can stress the MR head and adversely affect its operational reliability over time.

Thus, in order to optimize the performance of the MR head, the maximum bias current that can be safely applied to the MR head must be determined. The accuracy in determining this optimal bias current depends directly on the accuracy in measuring the resistance of the MR head; the greater the accuracy of the MR head resistance measurement, the greater the accuracy that can be achieved in determining the optimal bias current. In this way, accurate measurement of the MR head resistance is crucial for optimal MR head performance.

Accordingly, there is a need for a magnetic data storage and retrieval system that measures the resistance of the MR head with greater accuracy in order to optimize the bias current to the MR head.

BRIEF SUMMARY OF THE INVENTION

The present invention is a magnetic data storage and retrieval system. A preamplifier circuit is operably coupled to a magnetoresistive head and a resistor, and applies a first current to the magnetoresistive head and a second current to the resistor. A voltage measurement circuit measures a first voltage across the magnetoresistive head and a second voltage across the resistor. A resistance calculation circuit calculates a resistance of the magnetoresistive head based upon the first and second voltages.

DETAILED DESCRIPTION

Magnetic data storage and retrieval systems typically utilize an MR head resistance measurement system located on the MR head chip to measure the resistance of the MR head whenever it is required to optimize a bias current to the MR head. This measurement can be done any time before the magnetic data storage and retrieval system performs a read function or a write function.

Figure 1:
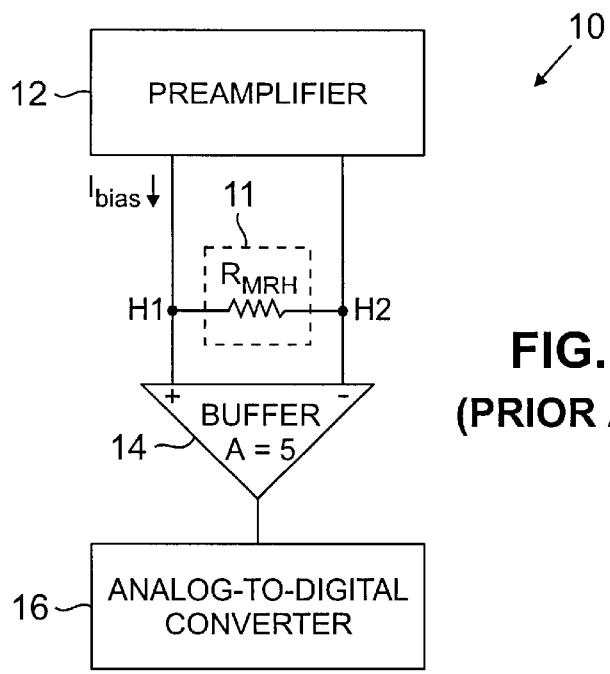
FIG. 1 shows a block diagram of a prior art MR head resistance measurement system.

FIG. 1 shows a block diagram of a prior art MR head resistance measurement system 10. Prior art MR head resistance measurement system 10 measures the resistance of MR head 11, which is represented in FIG. 1 as a resistor $R_{MRH}$. Prior art MR head resistance measurement system 10 includes a preamplifier 12, a buffer stage 14, an analog-to-digital converter 16, and head nodes H1 and H2.

Preamplifier 12 has first and second output nodes connected respectively to head nodes H1 and H2. MR head 11 is connected between head nodes H1 and H2. Preamplifier 12 applies a bias current $I_{bias}$ to MR head 11 from head node H1 to H2.

Buffer stage 14 has first and second input nodes, and an output node. The first and second input nodes of buffer stage 14 are connected respectively to head nodes H1 and H2. Buffer stage 14 measures a voltage $V_{MRH}$ across MR head 11 between its first and second input nodes. Buffer stage 14 then multiplies voltage $V_{MRH}$ by a scale factor A (in this example A=5) and provides the resulting scaled voltage signal at its output node. Buffer stage 14 also electrically isolates preamplifier 12 from noise generated by analog-to-digital converter 16.

Analog-to-digital converter 16 has an input node connected to the output node of buffer stage 14. Analog-to-digital converter 16 converts the scaled voltage signal from buffer stage 14 to digital form, and then calculates the resistance $R_{MRH}$ of MR head 11 according to the following equation:

$$R_{MRH} = V_{MRH} * A / I_{bias}$$

Prior art MR head resistance measurement system 10 typically experiences a measurement error of about 10–15%. Because the MR head resistance measurements are made in an operating environment where MR head 11 is used, prior art MR head resistance measurement system 10 is affected by circuit parameter variations such as temperature. The accuracy of the MR head resistance measurement depends on the accuracy of analog-to-digital converter 16, buffer stage 14, and bias current $I_{bias}$ in this operating environment. A common method of reducing the measurement error of prior art MR head resistance measurement system 10 is to increase the accuracy of analog-to-digital converter 16. This is accomplished by increasing the complexity, or the number of bits, of analog-to-digital converter 16. Increasing the number of bits, however, significantly increases the die area, power consumption, and cost of analog-to-digital converter 16. As a result, it has not been previously possible to achieve a measurement error of less than 1% while satisfying the die area restraints and cost restraints required by today's magnetic data storage and retrieval systems.

Figure 2:
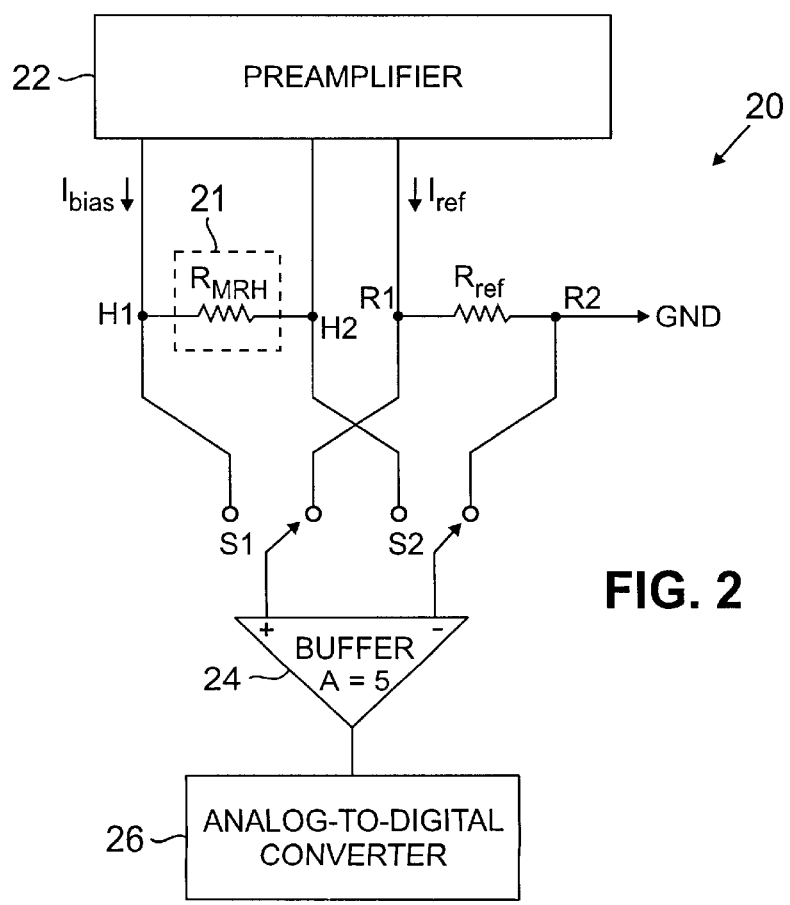
FIG. 2 shows a block diagram of an MR head resistance measurement system incorporating the present invention.

FIG. 2 shows a block diagram of an MR head resistance measurement system 20 incorporating the present invention.

MR head resistance measurement system 20 measures the resistance of MR head 21, which is represented in FIG. 2 as a resistor $R_{MRH}$. MR head resistance measurement system 20 includes a preamplifier 22, a buffer stage 24, an analog-to-digital converter 26, an external reference resistor $R_{ref}$, switches S1 and S2, head nodes H1 and H2, resistor nodes R1 and R2, and a fixed potential GND.

Preamplifier 22 has first, second, and third output nodes, wherein the first and second output nodes are used to provide a bias current $I_{bias}$ and the third output node is used to provide a reference current $I_{ref}$. The first and second output nodes are connected respectively to head nodes H1 and H2, and the third output node is connected to resistor node R1. MR head 21 is connected between head nodes H1 and H2, and resistor $R_{ref}$ is connected between resistor nodes R1 and R2, with resistor node R2 connected to fixed potential GND. Preamplifier 22 applies bias current $I_{bias}$ to MR head 21 from head node H1 to H2, and applies reference current $I_{ref}$ to resistor $R_{ref}$ from resistor node R1 to R2. Reference current $I_{ref}$ is typically much smaller than bias current $I_{bias}$ to minimize power consumption. In addition, the value of resistor $R_{ref}$ is typically much greater than the resistance $R_{MRH}$ of MR head 21 such that the ratio $R_{ref}/R_{MRH}$ is approximately equal to the ratio $I_{bias}/I_{ref}$. This creates voltages of the same order across resistor $R_{ref}$ and MR head 21.

Buffer stage 24 has first and second input nodes, and an output node. The first and second input nodes of buffer stage 24 are connected respectively to switches S1 and S2. During a calibration mode, switches S1 and S2 selectively connect the first and second input nodes of buffer stage 24 to first and second resistor nodes R1 and R2, respectively. At this time, buffer stage 24 measures a voltage $V_{ref}$ across resistor $R_{ref}$. Buffer stage 24 then multiplies voltage $V_{ref}$ by a scale factor A (in this example A=5) and provides the resulting scaled voltage signal at its output. During a measurement mode, switches S1 and S2 selectively connect the first and second input nodes of buffer stage 24 to first and second head nodes H1 and H2, respectively. At this time, buffer stage 24 measures a voltage $V_{MRH}$ across MR head 21. Buffer stage 24 then multiplies voltage $V_{MRH}$ by scale factor A and provides the resulting scaled voltage signal at its output node. Buffer stage 24 also electrically isolates preamplifier 22 from noise generated by analog-to-digital converter 26.

Analog-to-digital converter 26 has an input node connected to the output node of buffer stage 24. Analog-to-digital converter 26 converts the scaled voltage signals from buffer stage 24 to digital form, and stores the digital voltage signals in memory. Analog-to-digital converter 26 then calculates the resistance $R_{MRH}$ of MR head 21 according to the following equation:

$$R_{MRH} = \frac{V_{MRH}}{V_{ref}} * \frac{R_{ref}}{K}$$

where K is a constant equal to the ratio $I_{bias}/I_{ref}$.

MR head resistance measurement system 20 typically experiences a measurement error of less than 1%. The measured resistance $R_{MRH(meas)}$ of MR head 21 is expressed as:

$$R_{MRH(meas)} = \frac{V_{MRH(meas)}}{V_{ref(meas)}} * \frac{R_{ref}}{K}$$

where $V_{MRH(meas)}$ is the measured voltage across MR head 21 and $V_{ref(meas)}$ is the measured voltage across resistor $R_{ref}$. Measured voltages $V_{MRH(meas)}$ and $V_{ref(meas)}$ can be expressed as:

$$V_{MRH(meas)} = V_{MRH}(1 + E_1)$$

$$V_{ref(meas)} = V_{ref}(1 + E_2)$$

where $V_{MRH}$ is the actual voltage across MR head 21, $E_1$ is the voltage measurement error associated with MR head 21, $V_{ref}$ is the actual voltage across resistor $R_{ref}$, and $E_2$ is the voltage measurement error associated with resistor $R_{ref}$. From this the measured resistance $R_{MRH(meas)}$ of MR head 21 can now be expressed as:

$$R_{MRH(meas)} = \frac{V_{MRH}(1 + E_1)}{V_{ref}(1 + E_2)} * \frac{R_{ref}}{K}$$

Because both measurement error $E_1$ and $E_2$ are measured by the same instrument and because voltages $V_{MRH}$ and $V_{ref}$ are of the same order, any difference between measurement error $E_1$ and $E_2$ is negligible and the measurement errors cancel each other. As a result, the above expression can be reduced to:

$$R_{MRH(meas)} = \frac{V_{MRH}}{V_{ref}} * \frac{R_{ref}}{K}$$

This shows that the accuracy of measured resistance $R_{MRH(meas)}$ does not depend on the accuracy of measured voltages $V_{MRH(meas)}$ and $V_{ref(meas)}$. Instead, the accuracy of measured resistance $R_{MRH(meas)}$ depends only on the accuracy of resistor $R_{ref}$.

Therefore, if the value of resistor $R_{ref}$ has an error (or tolerance) of less than 1%, then MR head resistance measurement system 20 will experience a measurement error of less than 1%.

Thus, the present invention provides a magnetic data storage and retrieval system that measures the resistance of the MR head with greater accuracy in order to optimize the bias current to the MR head.

Although the present invention has been described with reference to preferred embodiments, workers skilled in the art will recognize that changes may be made in form and detail without departing from the spirit and scope of the invention.

What is claimed is:

1. A magnetic data storage and retrieval system, the system comprising:

a magnetoresistive head;

a resistor; and measuring means operably coupled to the magnetoresistive head and the resistor for measuring a magnetoresistive head resistance with an error equal to a tolerance of the resistor.

2. The system of claim 1 wherein the measuring means operates in a calibration mode and a measurement mode.

3. The system of claim 2 wherein the measuring means includes first and second switches operable to selectively connect the system to the resistor in the calibration mode and to the magnetoresistive head in the measurement mode.

4. The system of claim 3 wherein the measuring means further includes a buffer stage connected to the first and second switches, wherein the first and second switches selectively connect the buffer stage to the resistor during the calibration mode and to the magnetoresistive head during the measurement mode.

5. The system of claim 4 wherein the buffer stage measures a first voltage across the resistor during the calibration mode and measures a second voltage across the magnetoresistive head during the measurement mode.

6. The system of claim 4 wherein the buffer stage exhibits a gain.

7. The system of claim 5 wherein the measuring means further includes an analog-to-digital converter connected to the buffer stage.

8. The system of claim 7 wherein the analog-to-digital converter calculates the magnetoresistive head resistance based upon the first and second voltages.

9. The system of claim 1 wherein the tolerance of the resistor is less than 1%.

10. A magnetic data storage and retrieval system, the system comprising:

a magnetoresistive head;

a resistor;

a preamplifier circuit operably coupled to the magnetoresistive head and the resistor, to apply a first current to the magnetoresistive head and a second current to the resistor, in which a ratio of the first current to the second current is fixed;

a voltage measurement circuit for measuring a first voltage across the magnetoresistive head and a second voltage across the resistor; and a resistance calculation circuit for calculating a resistance of the magnetoresistive head based upon the first and second voltages.

11. The system of claim 10 further comprising first and second switches for selectively connecting the voltage measurement circuit to the resistor during a calibration mode and to the magnetoresistive head during a measurement mode.

12. The system of claim 11 wherein the voltage measurement circuit comprises a buffer stage connected to the first and second switches.

13. The system of claim 12 wherein the buffer stage exhibits a gain.

14. The system of claim 10 wherein the resistance calculation circuit comprises an analog-to-digital converter connected to the voltage measurement circuit for converting the first voltage to a first digital voltage, and converting the second voltage to a second digital voltage.

15. The system of claim 14 wherein the analog-to-digital converter divides the first digital voltage by the second digital voltage.

16. The system of claim 10 wherein a ratio of the first current to the second current is approximately equal to a ratio of the resistor to the resistance of the magnetoresistive head.

17. The system of claim 10 wherein the resistor has a tolerance of less than 1%.

18. A method of measuring a resistance of a magnetoresistive head, the method comprising:

measuring a first voltage across a resistor;

measuring a second voltage across the magnetoresistive head; and calculating the resistance of the magnetoresistive head as a function of the first and second voltages.

19. The method of claim 18 wherein calculating the resistance of the magnetoresistive head includes converting the first voltage to a first digital voltage, and converting the second voltage to a second digital voltage.

20. The method of claim 19 wherein calculating the resistance of the magnetoresistive head further includes dividing the second digital voltage by the first digital voltage.

* * * * *